United States Patent [19]
Ishizawa et al.

[11] 3,935,842
[45] Feb. 3, 1976

[54] SUCTION SYSTEM OF INTERNAL COMBUSTION ENGINE

[75] Inventors: Toshitugu Ishizawa, Higashi-murayama; Motokazu Akahori; Hideki Sato, both of Tokyo, all of Japan

[73] Assignee: Nissan Motor Co., Ltd., Yokohama, Japan

[22] Filed: Apr. 22, 1974

[21] Appl. No.: 463,182

[30] Foreign Application Priority Data
Apr. 23, 1973 Japan.................................. 48-45992

[52] U.S. Cl......................... 123/52 MF; 261/DIG. 6
[51] Int. Cl.²......................................... F02B 77/00
[58] Field of Search...................... 123/142, 52 MF; 261/DIG. 6; 137/599.2

[56] References Cited
UNITED STATES PATENTS

| | | | |
|---|---|---|---|
| 1,493,975 | 5/1924 | Folberth et al. | 137/599.2 X |
| 1,673,306 | 6/1928 | Ball | 137/599.2 X |
| 1,735,635 | 11/1929 | Bragg et al. | 137/599.2 X |
| 1,872,412 | 8/1932 | Cole | 137/599.2 |
| 2,337,982 | 12/1943 | Ericson | 123/52 MF |
| 2,770,224 | 11/1956 | Ericson | 123/52 MF |
| 3,167,059 | 1/1965 | Love | 123/52 MF |
| 3,344,808 | 10/1967 | Cary | 137/599.2 |
| 3,810,454 | 5/1974 | Hunt | 123/52 MF X |
| 3,814,069 | 6/1974 | Croft et al. | 123/52 MF X |

FOREIGN PATENTS OR APPLICATIONS 421,011 5/1947 Italy................... 123/52 MF

*Primary Examiner*—Wendell E. Burns
*Assistant Examiner*—William C. Anderson

[57] ABSTRACT

A suction system of an internal combustion engine, comprising a reed valve in the suction pipe in the vicinity of the suction port for opening and closing the passage of the suction pipe thereby preventing the backward flow of gases, said reed valve having a valve seat member with a valve opening thereon, a support pin pivotally and eccentrically supporting the valve seat member, and a reed fixed on the valve seat member so as to open and close the valve opening of the valve seat member, and means for opening the passage of the suction pipe by rotating the valve seat member only when the engine speed is high.

6 Claims, 4 Drawing Figures

SUCTION SYSTEM OF INTERNAL COMBUSTION ENGINE

This invention relates in general to the intake system of an internal combustion engine and particularly, to the intake system of an internal combustion engine the intake pipe of which is provided with a reed valve therein.

In an internal combustion engine in which the overlap period, i.e., the period when the intake port and the exhaust port are simultaneously opened, is long; a part of the exhaust gas or a part of the intake gas once drawn in tends to flow back towards the carburetor causing improper operation of the engine leading to various troubles, especially when the engine speed is low. In order to prevent such disadvantages, a conventional engine is usually provided with an intake system having a check valve or a reed valve, which is opened and closed in dependence on the intake vacuum of the engine, and which is in the vicinity of the intake port of the intake manifold branch connecting the carburetor and the engine combustion chamber. Such a conventional intake system provided with a reed valve of the type mentioned above may eliminate the above-mentioned disadvantages when the engine speed is low, however, it still has the disadvantage in that the reed valve, which is not required when the engine is rotated at high speed, inevitably increases the resistance to flow of gas flowing through the intake pipe when the engine speed is high reducing the output of the engine. In addition, the reed valve itself has the disadvantage in that it is liable to damage because it is subjected to repeated stresses caused by vibration at high engine speeds and stresses due to back-fire, etc. at low engine speeds, and in that its performance at low engine speeds will be deteriorated if the reed is made thicker in order to increase its durability.

Therefore, it is an object of the present invention to provide an intake or suction system of an internal combustion engine having a reed valve in each intake or suction pipe, which may operate without reducing the output of the engine and which performs well and is durable.

It is another object of the present invention to provide an intake or suction system of an internal combustion engine having a reed valve in each intake or suction pipe, which may reduce the resistance to flow of gas through the intake or suction pipe to cause no reduction in engine output at high engine speed.

It is still another object of the present invention to provide an intake or suction system of an internal combustion engine having a reed valve in each intake pipe, the reed of which may be made thin to improve the valve performance at low engine speed.

According to the present invention, there may be provided an intake system of an internal combustion engine, comprising a carburetor, a throttle valve provided in said carburetor, an intake pipe communicating with said carburetor, an intake port provided in said engine and communicating with said intake pipe, a reed valve provided in said intake pipe in the vicinity of said intake port for opening and closing the passage of said intake pipe, said reed valve having a valve seat with a valve opening thereon, a support pin pivotally and eccentrically supporting said valve, and a reed fixed on said valve seat to open and close said valve opening of said valve, and means for opening the passage of said intake pipe by rotating said valve to reduce resistance to flow therethrough only when the engine speed is high.

Further and more specific objects and advantages of the present invention and the manner in which it is carried into practice are made apparent in the following description with reference to the accompanying drawing, in which.

Figure 1:
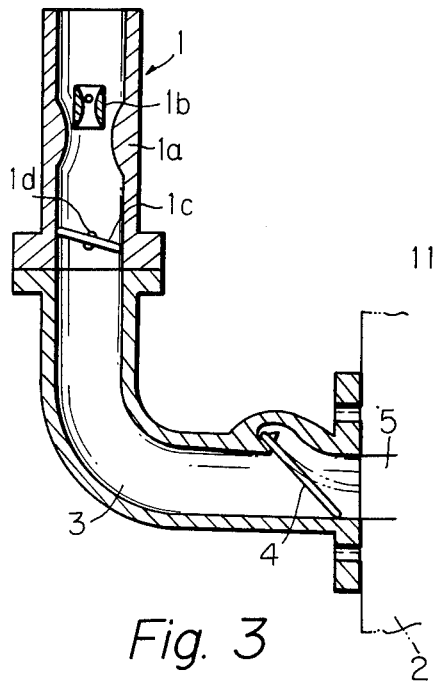
FIG. 1 is a schematic section view of a conventional suction system of an internal combustion engine.

Referring now to the drawings, wherein like reference numerals or characters designate like or corresponding parts throughout the several views, FIG. 1 illustrates a prior art suction system of an internal combustion engine. Before describing the present invention fully, it will be helpful to describe the advantages and disadvantages of the prior art suction system with reference to FIG. 1. Numeral 1 designates a carburetor in which a primary venturi $1a$, a secondary venturi $1b$ and a throttle valve $1c$ with its shaft $1d$ are provided as is well known. An engine 2 shown by a phantom line is connected to the carburetor 1 through a suction pipe 3 which communicates with a suction port 5 of the engine 2. A reed valve 4 acting as a check valve is provided in the suction pipe in the vicinity of the suction port. The reed valve 4 is adapted to be opened and closed in dependence on suction vacuum. With this construction, the conventional suction system equipped with a reed valve in each suction pipe can prevent the exhaust gas or the suction gas once drawn in the engine from flowing back towards the carburetor at low engine speeds. However, as mentioned above, the reed valve of this type in this suction system has the disadvantage in that it increases the resistance to flow of gases through the suction pipe 3 at high engine speeds thereby reducing the output of the engine.

Figure 2:
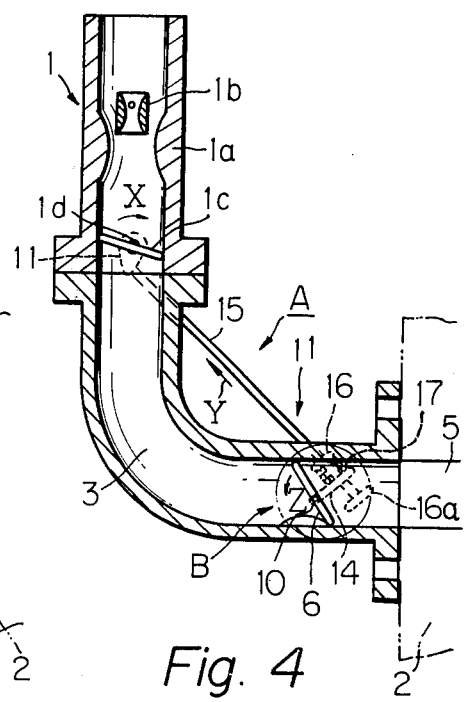
FIG. 2 is a schematic section view of a suction system of an internal combustion engine according to the present invention.
Figure 3:
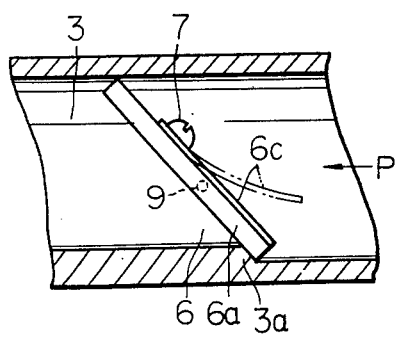
FIG. 3 is an enlarged view of portion B in FIG. 2.
Figure 4:
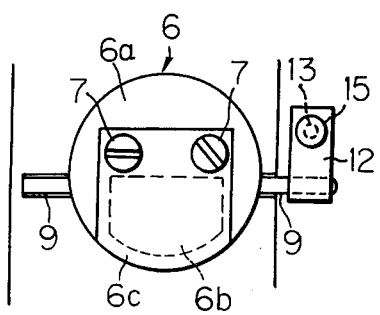
FIG. 4 is a cross section view of FIG. 3.

Now the present invention will be described hereinafter in detail with reference to FIGS. 2 to 4. In FIG. 2, a suction system A of an internal combustion engine according to the present invention has a carburetor 1 and a suction pipe 3, as in the case of the conventional suction system shown in FIG. 1. The suction pipe 3 communicates with a suction port 5 of an engine 2. In this suction pipe 3, reed valve 6 according to this invention is provided at B in the vicinity of the suction port 5. This reed valve consists of a valve seat $6a$ with a valve opening $6b$ and a reed $6c$ fixed to the valve seat $6a$ by a plurality of small screws 7 so as to cover the valve opening $6b$. The valve 6 is rotatably supported by a support pin 9 eccentrically fixed thereto at a position a little way off-centered towards the half of the valve 6 where the valve opening $6b$ is located. The valve 6 is normally kept in engagement with a shoulder $3a$ of the suction pipe 3. At one end of the support pin 9, there is provided a valve control device 10 which rotates the valve 6 disengaging the shoulder $3a$ when the engine speed is high. This control device 10 consists of a lever 11 connected to the throttle valve shaft $1d$ of the throttle valve $1c$ of the carburetor 1, a lever 12 connected to the support pin 9 of the valve 6, a link 13 operatively connecting the levers 11 and 12, a stopper 14 provided on the link 13, stopper 15 provided on the link 13 for engaging with the lever 12 when the throttle valve $1c$ reaches a predetermined opening, a spring 16 provided between the lever 12 and the stopper 14 for urging the valve 6 to engage the shoulder 3a through the lever 12.

In this embodiment, the valve control device 10 is shown as described above. However, this control device may be of a type which disengages the valve 6 from the shoulder 3a by a diaphragm device, etc. only in response to the difference between the suction vacuum created at high engine speeds and that created at low engine speeds, or may be of a type which engages and disengages the valve 6 and the shoulder 3a in response to the engine speed.

With the construction described above, the device of this embodiment operates as follows:

When the engine speed is low, the reed 6c closes the opening 6b of the valve seat 6a in response to the suction vacuum of the engine to prevent backward flow of gases from the engine. In cases where an unusually great force is imposed on the reed valve 6 in the direction of P shown in FIG. 3 due to back fire, etc., the valve 6 is rotated about the pin 9 to disengage the shoulder 3a thus opening the passage of the suction pipe 3. This rotation of the valve 6 is carried out against the action of the spring 16 and, therefore, its timing can be adjusted by adjusting the set spring force of the spring 16.

When the throttle valve 1c is rotated towards the fully-opened position in the direction of the arrow X shown in FIG. 2, the engine speed increases. This rotation of the throttle valve 1c results in the movement of the link 13 in the direction of the arrow Y shown in FIG. 2. This movement of the link 13, in turn, causes the lever 12 to engage with the stopper 15 thereby rotating the valve 6 in the direction of the arrow Z shown in FIG. 2 to open the passage of the suction pipe 3.

It should be understood from the foregoing description that since the suction system for an internal combustion engine according to this invention has a reed valve which can be rotated in the direction of opening the passage of the suction pipe when the engine speed is high, it can decrease the resistance of the gases to flow at high engine speeds. Therefore, the suction system according to this invention can eliminate the disadvantage of a conventional suction system according to which the reed valve, which is not necessary at high engine speeds, may increase the suction resistance of the mixture flowing through the suction pipe thereby decreasing the engine output.

It should also be understood that the suction system according to this invention is provided with a valve which is pivotally supported by a support pin fixed thereon at an off-centered position and, therefore, the valve can be rotated to open the passage of the suction pipe thereby preventing damage to the reed valve when an unusually great force is imposed on the reed valve due to back fire, etc. In addition, as mentioned above, the reed valve according to this invention is not in operation when the engine speed is high, its durability can be greatly improved compared with a conventional one.

Moreover, since forces acting upon the reed valve according to this invention are not great, as mentioned above, its reed can be made thinner than that of a conventional reed valve thereby improving its performance.

What is claimed is:

1. A suction system of an internal combustion engine, comprising a suction pipe for suction air flow to the engine; a throttle valve provided in the suction pipe; a suction port downstream the throttle valve and adjacent the engine; a reed valve provided in said suction pipe in the vicinity of said suction port for preventing exhaust gas backflow from the engine to the suction pipe, said reed valve having a valve seat with a valve opening therein, a support pin pivotally supporting said valve, and a reed fixed on said valve seat to open the valve opening of said valve seat in dependence on vacuum downstream of the valve and to close the valve opening in dependence on pressure downstream of the valve, and control means for opening communication through said suction pipe by rotating said valve to a position of reduced resistance to flow therethrough when the engine load exceeds a predetermined value.

2. A suction system of an internal combustion engine as set forth in claim 1, wherein said support pin is mounted off center on said valve towards the location of said valve opening, such that said valve automatically opens the passage of said suction pipe when said reed valve is subjected to a relatively high pressure.

3. A suction system of an internal combustion engine as set forth in claim 1, wherein said control means comprise a first lever connected to said throttle valve, a second lever connected to said support pin of said valve, a link connecting said first and second levers, a first stopper provided on said link, a second stopper provided on said link for engaging with said second lever when said throttle valve reaches a predetermined degree of opening, and a spring provided between said second lever and said first stopper for urging said valve towards its closed position through said second lever.

4. A suction system of an internal combustion engine, comprising a suction pipe for suction air flow to the engine; a throttle valve provided in the suction pipe; a suction port downstream of the throttle valve and adjacent the engine; a reed valve provided in said suction pipe in the vicinity of said suction port for preventing exhaust gas backflow from the engine to the suction pipe, said reed valve including an annulus valve body in its closing position inclined at an angle with respect to a plane containing the vertical cross section of the suction pipe in a direction of the exhaust gas backflow annd pivotally movable to an opening position in said direction of inclination, a support pin for pivotal movement of the valve body, said support pin being located at an offset from the diameter of the valve body whereby the backflow pressure exceeding a predetermined value causes the valve body to move to the opening position, means forming a valve opening in the valve body at a portion between the support pin and an inner wall of the suction pipe abutting the valve body and a flexible reed fixed to the valve body and yieldable to air flow to the engine to keep the valve opening open; and means for rotation of the support pin for pivotal movement of the valve body to the opening position when the engine load exceeds a predetermined value.

5. A suction system according to claim 4, in which the suction pipe is at its inner wall formed with an abutment shoulder to which the peripheral portion of the valve body defining the valve opening abuts.

6. A suction system of an internal combustion engine, comprising a suction pipe for suction air flow to the engine; a throttle valve provided in the suction pipe; a suction port downstreams of the throttle valve and adjacent the engine; a reed valve provided in said suction pipe in the vicinity of said suction port for preventing exhaust gas backflow from the engine to the suction pipe, said reed valve including an annulus valve body in its closing position inclined at an angle with respect to a plane containing the vertical cross section of the suction pipe in a direction of the exhaust gas backflow and pivotally movable to an opening position in said direction of inclination, a support pin for pivotal movement of the valve body, said support pin being located at an offset from the diameter of the valve body whereby the backflow pressure exceeding a predetermined value is permitted to move the valve body to the opening position, means forming a valve opening in the valve body at a portion between the support pin and an inner wall of the suction pipe abutting the valve body and a flexible reed fixed to the valve body and yieldable to air flow to the engine to keep the valve opening open; a linkage means connecting the throttle valve and the support pin for moving the valve body to the opening position when the throttle valve is in a predetermined open position; and a lost motion connection between the linkage means and the support pin for providing a lag between the movement of the valve body to the opening position due to the abnormal backflow pressure and the movement of throttle valve to the opening position.

* * * * *